April 26, 1966  A. J. LUCIANO ET AL  3,247,812
APPARATUS FOR CONDITIONING LAWNS

Filed Sept. 17, 1963  4 Sheets-Sheet 1

INVENTORS
ALFRED J. LUCIANO
ROBERT A. LUCIANO

BY Robert S. Dunham

Attorney

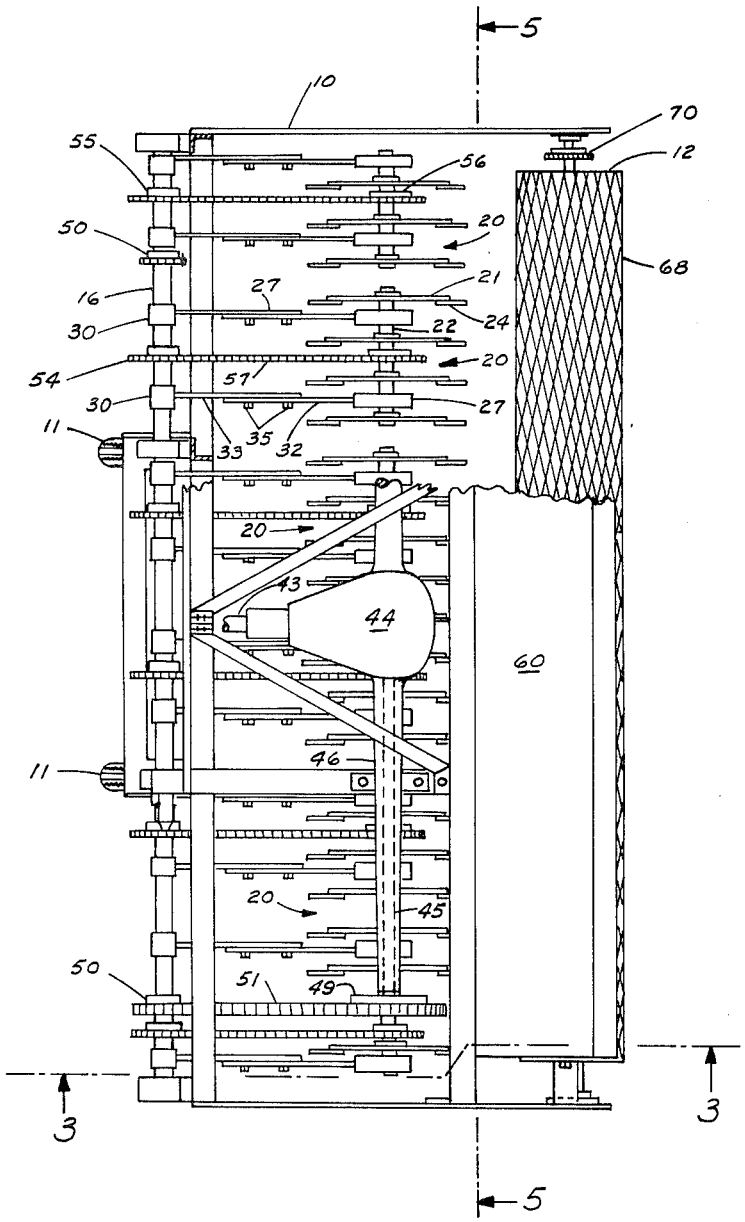

April 26, 1966   A. J. LUCIANO ETAL   3,247,812
APPARATUS FOR CONDITIONING LAWNS
Filed Sept. 17, 1963   4 Sheets-Sheet 3

INVENTORS
ROBERT A. LUCIANO
ALFRED J. LUCIANO
BY
Robert S. Dunham
Attorney

April 26, 1966  A. J. LUCIANO ETAL  3,247,812
APPARATUS FOR CONDITIONING LAWNS

Filed Sept. 17, 1963  4 Sheets-Sheet 4

INVENTORS
ROBERT A. LUCIANO
ALFRED J. LUCIANO
BY
Robert S. Dunham
Attorney

United States Patent Office 3,247,812
Patented Apr. 26, 1966

3,247,812
APPARATUS FOR CONDITIONING LAWNS
Alfred J. Luciano, Center Grove Road, Randolph Township, Morris County, N.J., and Robert A. Luciano, High Point Ave., Warren Township, Somerset County, N.J.
Filed Sept. 17, 1963, Ser. No. 309,460
9 Claims. (Cl. 111—1)

This invention relates to apparatus for conditioning soil, and in particular to apparatus for seeding and otherwise conditioning lawns. More particularly, the invention relates to lawn-seeding apparatus adapted for use with special advantage in reseeding existing lawns.

In restoring an established lawn which has deteriorated due to the development of bare spots or other unsightly or undesirable conditions, it is often necessary that all or part of the lawn be reseeded. The procedures conventionally employed in present-day commercial practice for reseeding substantial lawn areas are costly and time-consuming; typically, the entire surface to be reseeded is first turned over and broken up, destroying all existing turf, and the tilled soil is then prepared and seeded, in a succession of separate operations involving considerable manual labor. Furthermore (as also in the case of new lawns), the seeded area is vulnerable to damage from washouts or other ambient conditions, and remains unusable for as much as several months after seeding; the development of a usable, mature stand of grass with a deep root structure proceeds very slowly.

It is an object of the present invention to provide apparatus for preparing and seeding a lawn surface in a substantially unitary, integrated operation largely or entirely obviating the need for manual labor and enabling the expeditious and economical seeding or reseeding of large tracts. Another object is to provide such apparatus which implants the seed in relatively deep, uniform furrows, affording superior protection against damage by weather, washouts and other conditions while promoting relatively rapid development of a stand of grass having a deep root structure. A further object is to provide such apparatus for reseeding an established lawn area in the foregoing manner, without destroying the existing turf, while concomitantly aerating and thatching the existing turf, so that the turf is preserved to aid in protecting the seeded surface and thereby to enable immediate limited use of the reseeded area. Still another object is to provide such apparatus arranged to prepare and seed a broad strip of lawn surface on each pass and adapted to operate with substantially uniform effectiveness and depth of seed implantation over terrain of uneven or irregular contour.

To these and other ends, the present invention contemplates the provision of apparatus including a plurality of soil-cutting disks preferably bearing peripheral teeth, arranged to be drawn in parallel over a soil surface and to be rotated in a direction opposite to the direction of travel, in such manner as to cut relatively deep, parallel furrows in the soil surface. The apparatus of the invention further includes a seed-hopper, connected to be advanced over the ground with the disks, and positioned and adapted to discharge grass seed into the furrowed soil behind the disks. A roller disposed to pass over and loosely close the seeded furrows is also desirably incorporated in the apparatus. Conveniently these several elements are arranged in a frame adapted to be drawn by a tractor, with the power take-off of the tractor utilized, through appropriate drive means, for rotating the disks.

Especially for commercial and like large-scale operations, it is desirable that the apparatus prepare and seed a relatively wide strip on each pass, yet with uniform effectiveness of furrow-cutting across the full width of the strip. Accordingly, as a further and particularly important feature of the invention, to provide such furrow-cutting action the soil-cutting disks are arranged as a plurality of separately mounted sets of e.g. three to five disks each, which sets are disposed in side-by-side ganged relation and are individually pivotally connected to the frame in a manner permitting vertical movement of the several sets of disks relative to each other; thus as the array of disks passes over the ground the individual sets of disks follow the contour of the ground. This ganged arrangement of independently mounted sets of disks is of particular advantage in the reseeding of established lawns. Whereas a soil surface prepared for sowing of a new lawn may be fairly uniform and level, the surface of an established lawn very frequently has numerous humps and hollows; i.e. the level of the lawn surface, across the width of the strip seeded by the apparatus in a single pass, may vary in several places by as much as a few inches. The ganged mounting of the disks in sets vertically movable relative to each other enables the individual sets of disks to follow such surface humps and hollows closely, providing substantial uniformity of furrow depth (with concomitant uniformity in depth of seed implantation) over the full width of the strip, regardless of these surface irregularities, and without the necessity of re-grading or levelling off the lawn surface prior to the reseeding operation.

Further features and advantages of the invention will be apparent from the detailed description hereinbelow set forth, together with the accompanying drawings, wherein:

FIG. 2 is a plan view of the apparatus of FIG. 1, with the upper portions of the structure partially broken away to show the arrangement of furrow-cutting elements;

Figure 1:
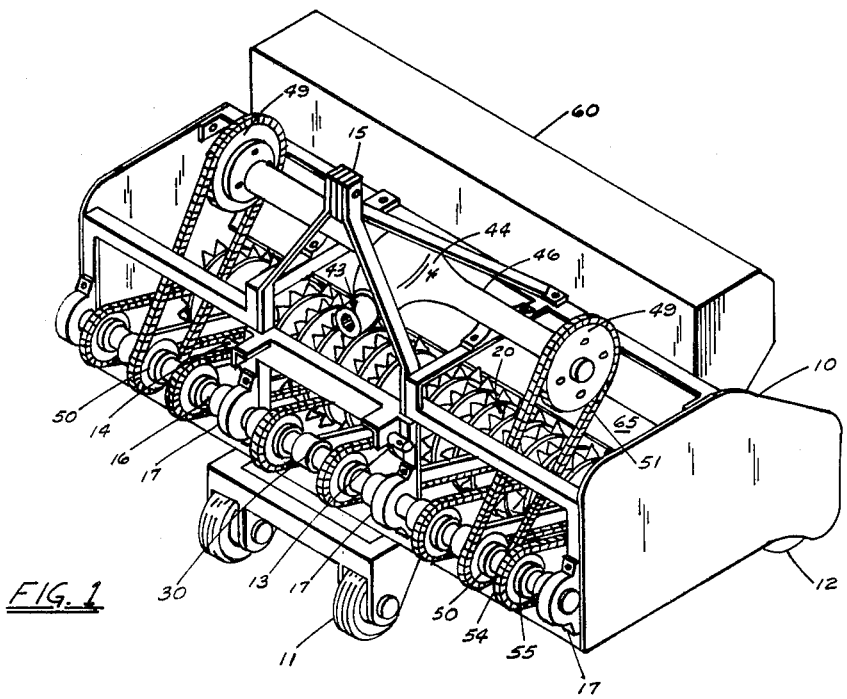
FIG. 1 is a perspective view of apparatus embodying the present invention in a particular form.

The apparatus of the invention in the exemplary embodiment of FIGS. 1–5 includes a generally rectangular frame 10, supported at its forward end by a pair of casters or wheels 11 and rearwardly by a roller 12 extending transversely of the direction of travel. This frame is adapted to be drawn over the ground by a conventional power-actuated mover such as a tractor (not shown), and accordingly has connections 13, 14 and 15 at its forward end for making a three-point hitch to the hydraulic lift mechanism of the tractor. A drive shaft 16, journalled in bearings 17 mounted on the front of the frame, extends transversely across the front of the frame, which is open to permit mechanical connection between the drive shaft and elements positioned within the frame.

A plurality of furrow-cutting elements 20, each comprising an independently mounted set or gang of soil-cutting disks 21, are arranged within the frame behind the drive shaft. The construction and arrangement of these sets of disks may be understood by consideration of FIG. 4, which illustrates in detailed plan view one of the sets of disks, further details of the disk structure and mounting being illustrated in the elevational view of FIG. 3.

Figure 3:
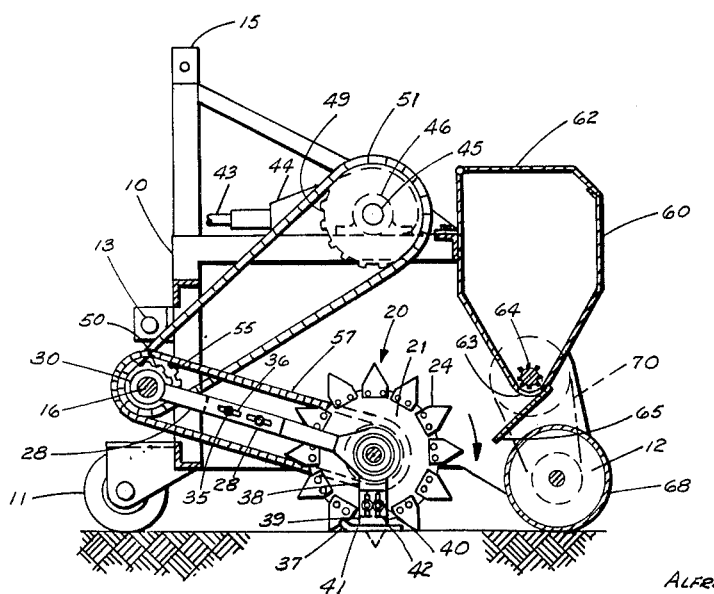
FIG. 3 is a sectional side elevational view taken along the line 3—3 of FIG. 2.
Figure 4:
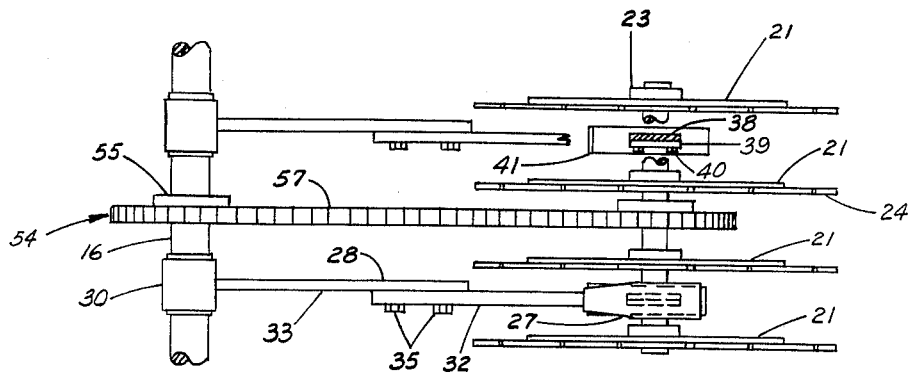
FIG. 4 is a fragmentary plan view showing details of arrangement of one of the furrow-cutting elements of the apparatus.

Referring then to FIG. 4, the single set of disks there shown comprises four of the disks 21 mounted in parallel, equally spaced relation on a shaft 22 extending through the centers of the disks, with the outermost disks of the set positioned at the respective extremities of the shaft. These disks are plane, circular metal members of uniform diameter each having a collar 23 welded to its central portion to hold the disks rigidly on the shaft. Each of the disks also bears a plurality of uniformly dimensioned flat triangular teeth 24 (as shown more particularly in FIG. 3) regularly disposed around the disk periphery to provide in effect a saw-tooth cutting edge for the disk. By way of specific example, the disks may be fabricated of ⅛ inch metal stock, each disk having a diameter of about 10 inches; the teeth 24, shown as riveted to the disks, may conveniently comprise hardened steel blades of the type commercially available for use in sickle-bar type mowers, e.g. having an overall dimension of about 3 inches by 2¾ inches with a triangular sharp-edge blade portion about 2 inches in height extending beyond the disk periphery.

The shaft 22 of this set of disks is journalled in a pair of sealed ball-bearing units 27 positioned in spaced relation along the shaft intermediate the outermost disks of the set. A pair of arms 28 are respectively attached to the pair of units 27 and extend forwardly and upwardly from the latter units to the drive shaft 16; at their forward ends, the arms 28 respectively terminate in bearings 30 engaging the drive shaft so as to pivot the arms on the drive shaft for vertical pivotal movement about the horizontal axis of the latter shaft. Thus, the element 20 comprising the set of disks 21 is pivotally suspended from the drive shaft 16 by the paired supported assemblies comprising units 27, arms 28 and bearings 30, in such manner as to be vertically movable relative to the drive shaft. Accordingly, as the frame 10 is advanced over the ground, the set of the disks 21 is drawn over the soil surface, with the shaft 22 disposed rearwardly of and parallel to the drive shaft 16 (i.e. extending transversely of the direction of travel) and the teeth of the disks engaging the soil surface to cut parallel furrows therein.

To facilitate removal of the set of disks from the apparatus, each of the arms 28 is shown as comprising two separate members 32, 33 respectively extending forwardly from the bearing unit 27 and rearwardly from the bearing 30. These arm members are secured together in overlapping relation as a single rigid arm by bolts 35; removal of the set of disks is accordingly effected by withdrawing the bolts 35 from each arm to disengage the members 32, 33. The members 33 are further shown in FIG. 3 as arranged to receive the bolts 35 in longitudinal slots 36 shaped and positioned to enable the overall length of the arms 28 to be increased or decreased by seating the bolts respectively in the rearward or forward ends of the slots.

The depth of the furrows cut by the set of disks is determined by the height of the shaft 22 above the soil surface. For uniformity of furrow-cutting depth, the shaft 22 is supported at a fixed predetermined height above the ground by a pair of support elements 37 respectively depending from the pair of bearing units 27 to engage the soil surface at spaced localities vertically beneath the latter shaft. As illustrated in FIG. 3, and also in FIG. 4 (wherein a portion of the shaft 22 and one of the units 27 are broken away to show the support element structure), each of these elements 37 comprises a first member 38, rigidly mounted on the unit 27 and depending therefrom; a second member 39, connected to the member 38 by bolts 40 to form a rigid, vertically depending leg; and a runner 41, mounted on the lower extremity of the member 39 to engage the soil surface beneath the shaft 22. The member 39 receives the bolts 40 in vertical slots 42 so arranged that the length of the support element (and thus the distance between the shaft 22 and the ground) can be varied by changing the position of the bolts in these slots. As the apparatus moves over the ground, the runner 41 of each support element glides along the soil surface and the support element holds the shaft 22 at a fixed distance above the surface; this distance is preferably so chosen that only the teeth 24 of the disks 21 engage the soil.

As shown in FIG. 2 (wherein some of the disk teeth 24 are omitted for simplicity of illustration), the complete apparatus of FIGS. 1–5 includes six of the elements 20 each having a separate shaft 22 carrying a set of the disks 21, and each constructed and arranged generally as described above. The shafts 22 of the respective elements are individually pivotally suspended (i.e. independently of each other) from the common drive shaft 16 by pairs of arms 28, and individually supported at a predetermined height above the ground by support elements 37 (not shown in FIG. 2). In the exemplary apparatus shown, five of the elements 20 have four disks each, and the other has three disks, providing a total array of twenty-three disks. The six furrow-cutting elements 20 are disposed within the frame 10 in side-by-side ganged relation behind the drive shaft 16, such that the respective shafts 22 are arranged substantially along a common rectilinear axis extending transversely of the direction of frame travel. The spacing between the elements 20 is so chosen that the distance between the respectively adjacent disks of adjacent elements is substantially equal to the spacing between disks on each individual element.

The six elements 20, disposed in such ganged relation, thus provide an array of parallel, evenly spaced disks extending substantially across the entire width of the frame in position to cut a broad strip of parallel and uniformly spaced furrows. At the same time, because the elements 20 are individually pivotally suspended from the drive shaft 16, they undergo independent vertical movement relative to each other to follow the contour of the ground over which they are drawn; i.e., each of the sets of disks "floats" up and down independently of the other sets of disks to follow the contour of the particular narrow strip of ground over which it passes, with the result that substantial uniformity of furrow-cutting depth is attained across the full width of the strip regardless of variations in surface level across the strip width. This independently floating action of the sets of disks, whereby they follow the contour of the ground as they pass over an uneven soil surface, is shown in simplified rear elevational view in FIG. 5.

By way of specific example, for seeding and reseeding lawns it is presently preferred to have a spacing of about two to three inches between disks (so as to cut furrows two to three inches apart), with the support elements 37 adjusted to provide a furrow depth of about 1½ inches. Thus, in the embodiment of FIGS. 1–5, assuming that the twenty-three parallel disks 21 are spaced about three inches apart, the total width of the strip cut by the array of disks is about sixty-six inches. Each individual four-disk gang or element 20 in this array of disks, however, is no more than about nine inches wide. Consequently, as the ganged sets of disks are drawn over the ground they closely follow surface irregularities (such as the humps and hollows commonly encountered in established lawn surfaces) even of very minor lateral extent as compared to the total width of the strip being cut, with resultant uniformity in furrow depth across the width of the strip.

To provide effective furrow-cutting action, the sets of disks described above are positively driven to rotate in a direction opposite to the direction of travel, i.e. opposite to the direction in which they would otherwise turn as they are drawn over the soil surface. Power drive for the disks is obtained from the power take-off (not shown) of the tractor which draws the apparatus. The tractor power take-off is connected by a conventional sliding-shaft arrangement (not shown) to the input shaft 43 of a conventional right-angle gear unit indicated generally at 44 and supported on the frame 10 at a central locality above and behind the drive shaft 16. A pair of shafts 45, respectively extending in opposite directions from the gear unit 44 transversely of the frame 10 and shown as journalled in housings 46 mounted on the frame, are linked to the tractor power take-off through the gear arrangement of unit 44 so as to be driven (i.e. rotated) by the power take-off. This rotation is transmitted to the drive shaft 16 through paired chain drives comprising sprockets 49 mounted at the respective extremities of the shafts 45, corresponding sprockets 50 mounted on the drive shaft, and chains 51 respectively linking the sprockets 49 to the sprockets 50.

The rotation of the drive shaft 16 is in turn transmitted to the separate shafts 22 of the respective elements 20 by individual chain drives 54 respectively linking the drive shaft to each of the shafts 22. Each of these drives 54 comprises a sprocket 55 mounted on the drive shaft and a sprocket 56 mounted on the respective shaft 22, linked by a chain 57; the aforementioned arrangement of slots 36 in the arm members 33 of the respective elements 20 facilitates adjustment of the length of the arms 28 to provide proper tension on the chains 57. The gear linkage in the unit 44 is so arranged that the drive from the tractor power take-off rotates all the sets of disks 21 simultaneously in a direction opposite to the direction of travel and preferably at a fairly rapid rate, e.g. about 250 r.p.m.

The apparatus of FIGS. 1–5 further includes a seed hopper 60, e.g. of a type conventionally used for sowing lawns, mounted on the frame 10 above and behind the furrow-cutting elements 20, and extending transversely across the frame. The form of hopper shown has a hinged lid 62 (to permit filling of the hopper with grass seed) and tapers downwardly to a discharge slit 63 also extending transversely of the frame. A conventional rotary agitator element 64 is mounted within the hopper immediately above the slit 63 to control discharge of seed through the slit.

Associated with the hopper 60 is a seed-distributing apron 65, comprising an elongated strip of sheet metal extending transversely of the frame 10 beneath the slit 63. The rear edge of the apron is secured to the hopper adjacent the rear edge of the slit; the side and forward edges of the apron are unsecured, so that the apron slopes downwardly and forwardly beneath the slit, with its forward edge hanging freely at some distance above the ground and immediately behind the furrow-cutting elements 20. As shown, the apron is so positioned that seed discharged from the hopper through the slit 63 passes across the surface of the apron, falling to the ground behind the disks 21 from the forward edge of the apron. The motion of the apparatus over the ground causes the sheet metal apron to vibrate, and this vibration of the apron serves to distribute the seed evenly across the full width of the strip of furrows cut by the sets of disks.

The roller 12, previously mentioned, is journalled in the rear portion of the frame 10 below and behind the seed hopper 60, in position to roll over the surface of the ground on which seed is deposited from the apron 65. This roller has a tread 68 of corrugated or openwork material such as expanded metal, providing a corrugated roller surface, and is dimensioned to pass over the full width of the strip of soil furrowed by the elements 20 and seeded by the hopper 60 and apron 65. As it thus rolls over the seeded furrows, it loosely closes the furrows to complete the implantation of the seed. The agitator 64 of the seed hopper is driven by the rotation of the roller, transmitted through a chain drive 70. This latter drive arrangement, for regulating discharge of seed from the hopper in accordance with the rotary motion of the roller so as to proportion the rate of seed discharge to the rate of advance of the apparatus over the ground, is entirely conventional and well-known in the art and hence need not be described in detail.

The operation of the apparatus of FIGS. 1–5 may now be readily understood. For use e.g. in reseeding an established lawn, the frame 10 is connected (by the frame portions 13, 14 and 15) to a tractor, and the gear unit 44 is connected to the tractor power take-off, the seed hopper being filled with grass seed. The steps of preparing and reseeding the lawn are then accomplished by the single operation of drawing the apparatus over the area to be seeded.

As the apparatus is thus drawn, the ganged sets of disks 21 are continuously rotated (by the drive transmitted from the tractor power take-off) in a direction opposite to the direction of travel, to cut a strip of parallel furrows in the lawn surface. This positive drive of the disks, together with the sharp-edged teeth provided for the disks, enables them to cut readily through the existing stand of turf, the direction of disk rotation being such as to throw the dirt from the furrows out ahead of the disks thereby leaving the furrows clean and open for the reception of seed. The furrow-cutting operation prepares the soil surface for seeding without destroying the existing turf, and indeed has a soil-aerating effect beneficial to the turf; in addition, the teeth of the disks catch and uproot broad-rooted weeds such as crabgrass to remove them from the lawn surface. The furrows thus cut are desirably uniform in depth across the full width of the strip, regardless of humps and hollows and other surface irregularities in the lawn, since the independently mounted sets of disks follow the contour of the ground, as explained above.

The seed hopper 60 continuously discharges grass seed as the apparatus advances, and this seed is distributed evenly over the full width of the strip of furrows by the vibrating motion of the apron 65, falling from the forward edge of the apron into and between the freshly cut furrows. The furrows are then loosely closed by the expanded metal roller 12, completing the seeding operation. As thus implanted, the grass seed lies in the relatively deep (e.g. 1½ inch deep) furrows cut by the disks, being thereby protected from washouts to promote development; such deep implantation also serves to promote development of a deep root structure for the new grass more rapidly than when the seed is sowed by conventional procedures which implant it at a very shallow level in the soil. The existing turf, being preserved by the sowing operation, aids in protecting the seed and (if a moderate stand of existing turf is present in the area being seeded) enables immediate limited use of the reseeded area without damage to the new seed.

In this connection, it may be explained that the conventional practice of sowing lawn grass seed at a shallow level is necessitated by the fact that the seed does not germinate and develop properly if it is heavily covered with soil or poorly aerated. The deep seed implantation provided by the present apparatus, however, is effected in a manner that does not interfere with germination or growth of the seedling grass. Because the disks 21 are rotated in such direction as to throw the soil out ahead of the furrows being cut, and also because the corrugated (e.g. expanded metal) tread surface of the roller 12 closes the seeded furrows only loosely, the amount of soil returned to the furrows in the present seeding operation is insufficient to refill the furrows completely and does not pack down over the seed; i.e., although the seed lies in relatively deep furrows, it is covered only with a light or shallow, loose, and well-aerated layer of soil. The superior protection and other advantages accorded by deep implantation are thereby attained without heavy coverage of the seed and consequently without impairment of seed germination.

It will be appreciated that the apparatus may be used for a variety of operations other than reseeding; for example, with the seed hopper 60 omitted or not functioning, the apparatus may be used to aerate and remove crabgrass from an existing lawn which does not require reseeding, since as previously mentioned the furrowing action of the disks has an aerating and thatching effect. The apparatus may also be used to seed a new lawn; in this case its operation is as described above for the reseeding of an existing lawn, and provides the advantages of facile and expeditious soil-preparing and seeding action with deep implantation of the seed.

Figure 6:
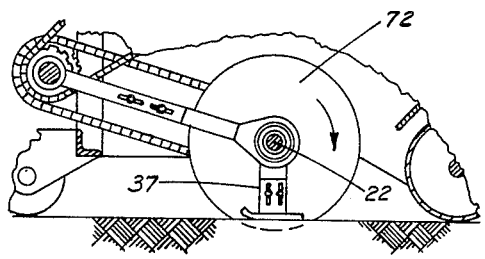
FIG. 6 is a fragmentary side elevational view showing an alternative form of furrow-cutting disk.
Figure 5:
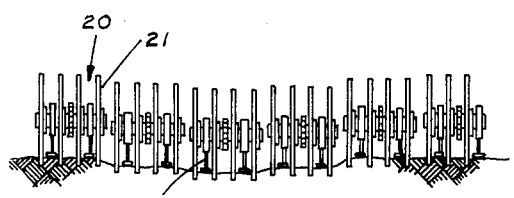
FIG. 5 is a simplified rear elevational view taken as along the line 5—5 of FIG. 2, illustrating the ganged arrangement of the furrow-cutting elements.

For certain of these operations, it may be desirable to employ sets of disks particularly adapted therefor and differing, e.g. in size of teeth or disk spacing, from the sets of disks described above; since the arms 28 are so arranged as to facilitate removal of the sets of disks from the apparatus, the sets of disks may readily be interchanged to provide the apparatus with disks of the character desired for the particular operation to be performed. By way of example, for the seeding of a new lawn in a newly-graded and vegetation-free soil surface (which may be quite soft and easy to work) the use of toothed disks is unnecessary. In such case it may be preferred to use disks having no teeth, mounted so that the edges of the disks themselves cut the furrows in the soil. Thus as shown in FIG. 6, the apparatus may be fitted with sets of plain soil-cutting disks 72 mounted as before on shafts 22, which are supported by support elements 37 at such height above the ground that the edges of the disks engage the soil surface to cut furrows of the desired depth.

Figure 7:
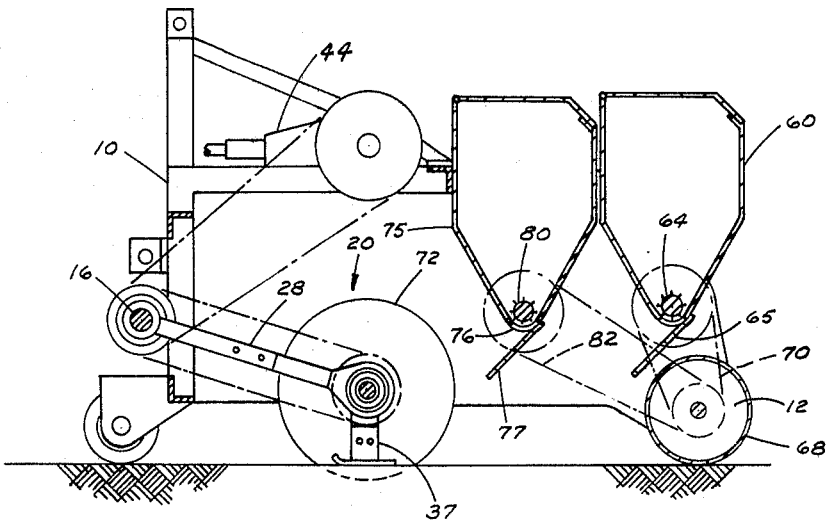
FIG. 7 is a simplified elevational view of a modified form of the apparatus including elements for applying fertilizer to the surface to be seeded.

The apparatus of the present invention may also be arranged to provide distribution of fertilizer on the lawn or soil surface to be seeded, so as to fertilize the soil incident to the sowing operation. Referring now to FIG. 7, there is shown in simplified elevational view an embodiment of the invention incorporating means for effecting such distribution of fertilizer. This apparatus of FIG. 7 is generally similar to that of FIGS. 1–5 and thus includes a plurality of furrow-cutting elements 20 each comprising a set of disks (shown for simplicity as plain disks 72), arranged in side-by-side ganged relation within a frame 10, and individually pivotally suspended from a drive shaft 16 by arms 28. As before, the sets of disks are supported at a predetermined height above the ground by support elements 37 and are driven (for rotation in a direction opposite to the direction of travel) by the power take-off of a tractor, i.e., through gear unit 44 and the chain drive linkages described above. Also mounted on the frame, as before, is a seed hopper 60 having an apron 65 and an agitator 64 driven by a chain drive 70 from a roller 12; this roller is positioned so that its corrugated (e.g., expanded metal) tread 68 passes over the furrowed surface cut by the elements 20 and seeded by the hopper 60 to loosely close the seeded furrows.

The apparatus of FIG. 7 particularly includes a second hopper 75, generally similar in structure and arrangement to the hopper 60 and mounted on the frame 10 in tandem with the latter hopper, i.e., ahead of the hopper 60 and rearwardly of the furrow-cutting elements 20. The hopper 75 is filled with a solid granular or particulate fertilizer and discharges the fertilizer (in the same manner as the hopper 60 discharges seed) at a locality immediately behind the furrow-cutting elements 20. Specifically, the hopper 75 has a downwardly opening discharge slit 76 beneath which extends a sheet metal apron 77 corresponding to the apron 65 of the hopper 60; the apron 77, like the apron 65, vibrates under the influence of the motion of the apparatus and thereby provides even distribution of the fertilizer, which is discharged through the slit 76 and passes across the apron 77, thence falling to the ground at the aforementioned locality. Such discharge of fertilizer is controlled by a conventional rotary agitator 80 mounted within the hopper 75 immediately above the slit 76; the agitator 80, like the agitator 64 of the hopper 60, is driven by the rotation of the roller 12 transmitted through a chain drive 82 to proportion the rate of fertilizer discharge to the rate of travel of the apparatus over the soil surface.

With this arrangement, the disks 72 of the furrow-cutting elements 20, as before, cut a strip of parallel furrows in the surface to be seeded as the apparatus is drawn by a tractor or like vehicle over the ground. Fertilizer is continuously discharged into the furrowed strip immediately behind the elements 20 by the hopper 75. Seed is discharged into the furrowed strip by the hopper 60 at a locality rearward of the locality of fertilizer discharge; and the seeded and fertilized furrows are loosely closed by the corrugated-surface roller 12. In such manner, fertilization of the soil surface is combined with the preparation and seeding of the soil in a single operation.

It is to be understood that the invention is not limited to the specific features and embodiments hereinabove set forth, but may be carried out in other ways without departure from its spirit.

We claim:

1. Lawn-seeding apparatus comprising, in combination, a frame adapted to be drawn over a soil surface; a plurality of furrow-cutting elements each including a rotatable shaft, arm means journalling said shaft and extending forwardly therefrom, a plurality of disks mounted in parallel spaced relation on said shaft for rotation therewith about a substantially horizontal axis of rotation, and means for individually supporting said shaft at a fixed height above the soil surface, each of said disks having a circumferential cutting edge portion comprising a plurality of soil-cutting teeth regularly disposed around the disk periphery and lying in a plane perpendicular to the axis of rotation of the disk for engaging the soil surface to cut a furrow therein, said arm means of said elements being individually pivotally connected to said frame forwardly of the respective shafts of said elements to suspend said elements from said frame in such manner that said elements are vertically movable relative to each other and are disposed to be drawn over the soil surface with the frame in side-by-side spaced ganged relation axially transverse of the direction of travel to cut substantially parallel strips of furrows in the soil surface, said disks on each said shaft being spaced apart for cutting individual parallel furrows in the soil surface and for leaving undisturbed parallel strips of soil surface between said furrows for preservation of existing turf; means for rotating the shafts of said elements in a direction opposite to the direction of travel; seed-hopper means mounted on said frame for discharging seed onto the soil surface at a locality rearward of said disks to deposit seed in said furrows; and roller means having a corrugated roller surface, journalled in said frame rearwardly of said last-mentioned locality for rolling the soil surface to close said furrows after deposit of seed therein.

2. Apparatus as defined in claim 1, wherein said disks are spaced between about 2 and about 3 inches apart on the respective shafts of said elements and wherein said elements are spaced relative to each other such that the distance between the respectively adjacent disks of adjacent elements is between 2 and about 3 inches.

3. Apparatus as defined in claim 2, wherein each of said elements has not less than 3 and not more than 5 disks.

4. Apparatus as defined in claim 1, wherein the shaft-supporting means of each of said elements includes at least one support member connected to said arm means and extending downwardly therefrom to engage the soil surface at a locality vertically beneath the shaft of the element to support said shaft at said fixed height above the soil surface.

5. Apparatus as defined in claim 1, wherein said fixed height, at which the shaft of each of said elements is supported, is selected such that said teeth of said disks engage the soil surface to cut furrows having a depth of about 1½ inches.

6. Lawn-seeding apparatus comprising, in combination, a frame adapted to be drawn over a soil surface by a power-actuated vehicle having a power takeoff; a drive shaft journalled in said frame and extending across said frame transversely of the direction of travel; a plurality of furrow-cutting elements each including a rotatable shaft, a pair of arms respectively journalling said last-mentioned shaft and extending forwardly therefrom, a plurality of disks mounted in spaced parallel relation on said last-mentioned shaft for rotation therewith about a substantially horizontal axis of rotation, and a pair of supporting elements respectively mounted on and extending downwardly from said pair of arms to engage the soil surface at respectively spaced localities vertically below said last-mentioned shaft to support said last-mentioned shaft at a fixed height above the ground, each of said disks having a circumferential cutting edge portion comprising a plurality of soil-cutting teeth regularly disposed around the disk periphery and lying in a plane perpendicular to the axis of rotation of the disk for engaging the soil surface to cut a furrow therein, said furrow-cutting elements being disposed in side-by-side spaced ganged relation rearwardly of said drive shaft and axially parallel thereto, and the forward extremities of said arms being individually pivotally connected to said drive shaft in such manner that said furrow-cutting elements are vertically movable relative to each other and are suspended to be drawn with said frame over the soil surface in said ganged relation to cut substantially parallel strips of furrows in the soil surface; means for rotating the shafts of said furrow-cutting elements in a direction opposite to the direction of travel, including means operatively connected to said power take-off to be driven by said power take-off for rotating said drive shaft in a direction opposite to the direction of travel, and chain drive means individually connecting the shafts of said furrow-cutting elements to said drive shaft for transmitting rotary motion of said drive shaft to said shafts of said furrow-cutting elements; a seed hopper mounted on said frame and having a seed-discharge slit extending transversely of the direction of travel of said frame; a sheet-metal apron positioned beneath said slit to receive seed discharge from said slit and direct said seed onto the soil surface rearwardly of said furrow-cutting elements, said apron being suspended from said hopper in such manner as to be vibrated by motion of said frame over the soil surface and thereby to distribute said seed evenly across the path of said furrow-cutting elements; and a roller having an expanded metal tread, journalled in said frame rearwardly of said apron for rolling the soil surface to close said furrows after deposit of seed therein.

7. Apparatus as defined in claim 6, wherein each of said arms of each of said furrow-cutting elements comprises a first member having at its rearward extremity a bearing portion journalling the shaft of the furrow-cutting element, and a second member pivotally connected at its forward extremity to said drive shaft, said first and second members being rigidly secured together in such manner as to be separable from each other and to be adjustable in position relative to each other to vary the distance between said shaft of said furrow-cutting element and said drive shaft.

8. Apparatus as defined in claim 6, wherein each of said support elements of each of said furrow-cutting elements comprises a first member mounted on and extending downwardly from one of said arms, and a second member having at its lower extremity a runner engaging the soil surface at a locality vertically below the shaft of the furrow-cutting element, said first and second members being rigidly secured together in such manner as to be adjustable in position relative to each other to vary said fixed height at which said last-mentioned shaft is supported above the soil surface.

9. Lawn-seeding apparatus comprising, in combination, a frame adapted to be drawn over a soil surface; a plurality of furrow-cutting elements each including a rotatably mounted shaft and a plurality of soil-cutting disks mounted on said shaft for rotation therewith about a substantially horizontal axis of rotation, each of said disks having a circumferential cutting edge portion lying in a plane perpendicular to the axis of rotation of the disk for engaging the soil surface to cut a furrow therein, said furrow-cutting elements being individually pivotally suspended from said frame in such manner as to be vertically movable relative to each other and to be drawn over the soil surface with the frame in side-by-side ganged relation to cut substantially parallel strips of furrows in the soil surface; means for rotating the shafts of said elements in a direction opposite to the direction of travel; seed-hopper means carried by said frame for discharging seed onto the soil surface at a locality rearward of said disks to deposit seed in said furrows, said seed-hopper means comprising a seed-hopper mounted on said frame and having a seed-discharge slit extending parallel to the shafts of said furrow-cutting elements, and a sheet-metal apron positioned beneath said slit to receive seed discharged from said slit and direct said seed onto the soil surface rearwardly of said furrow-cutting elements, said apron being suspended from said hopper in such manner as to be vibrated by motion of said frame over the soil surface and thereby to distribute said seed evenly across the path of said furrow-cutting elements; and roller means journalled in said frame rearwardly of said last-mentioned locality for rolling the soil surface to close said furrows after deposit of seed therein.

References Cited by the Examiner

UNITED STATES PATENTS

| | | | |
|---|---|---|---|
| 740,748 | 10/1903 | Fitz Maurice | 111—8 |
| 857,815 | 6/1907 | Long | 172—78 X |
| 980,484 | 1/1911 | Bradley | 172—52 |
| 994,707 | 6/1911 | Meissner | 111—84 |
| 1,289,023 | 12/1918 | Welsh | 172—80 |
| 1,345,362 | 7/1920 | Gueldenhaar. | |
| 1,795,182 | 3/1931 | Ross | 172—55 |
| 1,829,745 | 11/1931 | Grossi | 111—1 |
| 2,556,072 | 6/1951 | Dewey | 111—1 |
| 2,965,053 | 12/1960 | Gruber | 111—10 |
| 3,011,564 | 12/1961 | Dahlgren | 172—80 X |
| 3,110,275 | 11/1963 | Bonney | 111—1 X |

ABRAHAM G. STONE, *Primary Examiner.*

W. A. SMITH, III, *Assistant Examiner.*